(12) United States Patent  
Oldridge

(10) Patent No.: US 10,077,071 B2  
(45) Date of Patent: Sep. 18, 2018

(54) ELECTRIC VEHICLE POWER STEERING PUMP CONTROL SYSTEM

(71) Applicant: THOMSON POWER INC., Vancouver, British Columbia (CA)

(72) Inventor: David Oldridge, Victoria (CA)

(73) Assignee: Thomson Power Inc., Vancouver, BC (CA)

( * ) Notice: Subject to any disclaimer, the term of this patent is extended or adjusted under 35 U.S.C. 154(b) by 71 days.

(21) Appl. No.: 15/109,632

(22) PCT Filed: Dec. 3, 2014

(86) PCT No.: PCT/CA2014/051161  
§ 371 (c)(1),  
(2) Date: Jul. 3, 2016

(87) PCT Pub. No.: WO2015/100486  
PCT Pub. Date: Jul. 9, 2015

(65) Prior Publication Data  
US 2016/0332664 A1 Nov. 17, 2016

(30) Foreign Application Priority Data  
Jan. 3, 2014 (CA) .................................... 2838308

(51) Int. Cl.  
*B62D 5/065* (2006.01)  
*B62D 6/00* (2006.01)  
(Continued)

(52) U.S. Cl.  
CPC .............. *B62D 6/001* (2013.01); *B60L 1/003* (2013.01); *B60L 11/1816* (2013.01); *B62D 5/065* (2013.01); *B60L 2210/40* (2013.01); *B60L 2220/42* (2013.01); *B60L 2240/12* (2013.01); *B60L 2240/16* (2013.01); *B60L 2240/26* (2013.01); *B60L 2240/28* (2013.01); *B60L 2240/34* (2013.01); *B60L 2240/36* (2013.01); *B60L 2240/529* (2013.01);  
(Continued)

(58) Field of Classification Search  
CPC . B62D 5/065; G06K 9/00825; G06K 9/00791  
See application file for complete search history.

(56) References Cited

U.S. PATENT DOCUMENTS 3,992,882 A * 11/1976 Bodin ..................... B60L 1/003  
60/413  
2013/0032429 A1* 2/2013 Aimo Boot ............. B60K 6/48  
180/422

FOREIGN PATENT DOCUMENTS

CN 102582702 A * 7/2012  
JP 06107215 A * 4/1994  
(Continued)

*Primary Examiner* — Dale S Moyer

(57) ABSTRACT

An electrical system controller that sends an electrical current disable signal to an electrical switch for an electric vehicle's power steering pump motor upon a speed sensor providing input to the controller when the electric vehicle becomes stationary. A vehicle door position sensor senses when a door of the electric vehicle changes from open to closed and provides a door-open-to-closed input signal to the controller. The controller sends a signal to the electrical switch to reactivate a supply of electrical current supply to the power steering pump motor when a vehicle door position sensor senses that a door of the electric vehicle has changed from open to closed.

7 Claims, 4 Drawing Sheets

(51) Int. Cl.
*B60L 1/00* (2006.01)
*B60L 11/18* (2006.01)

(52) U.S. Cl.
CPC ... *B60L 2240/547* (2013.01); *B60L 2240/549* (2013.01); *B60L 2240/622* (2013.01); *B60L 2240/642* (2013.01); *B60L 2240/662* (2013.01); *B60L 2250/12* (2013.01); *B60L 2250/16* (2013.01); *B60L 2250/26* (2013.01); *Y02T 10/648* (2013.01); *Y02T 10/7005* (2013.01); *Y02T 10/7072* (2013.01); *Y02T 10/7241* (2013.01); *Y02T 10/7291* (2013.01); *Y02T 90/127* (2013.01); *Y02T 90/14* (2013.01); *Y02T 90/16* (2013.01); *Y02T 90/162* (2013.01)

(56) References Cited

FOREIGN PATENT DOCUMENTS

| | | | | |
|---|---|---|---|---|
| JP | 09182213 | A | * 7/1997 | |
| JP | 2006327542 | A | * 12/2006 | |
| WO | WO-2011117372 | A1 | * 9/2011 | ............... B60K 6/48 |

* cited by examiner

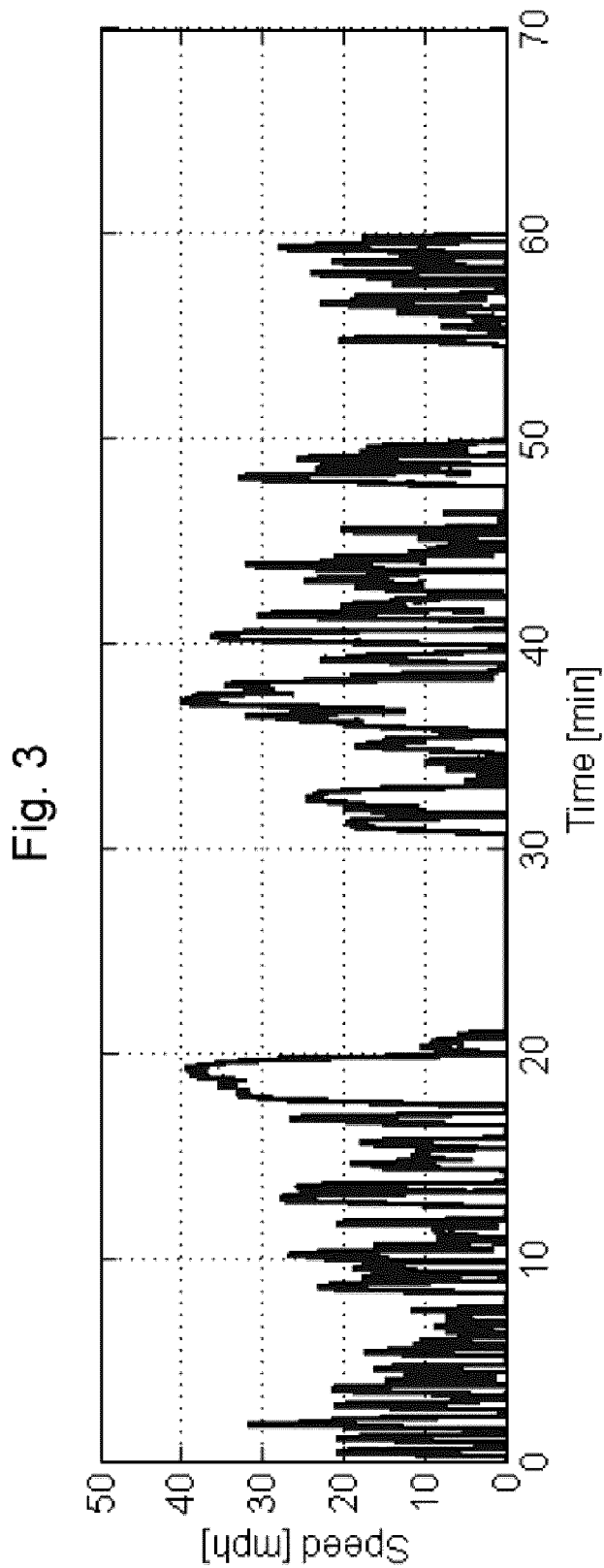

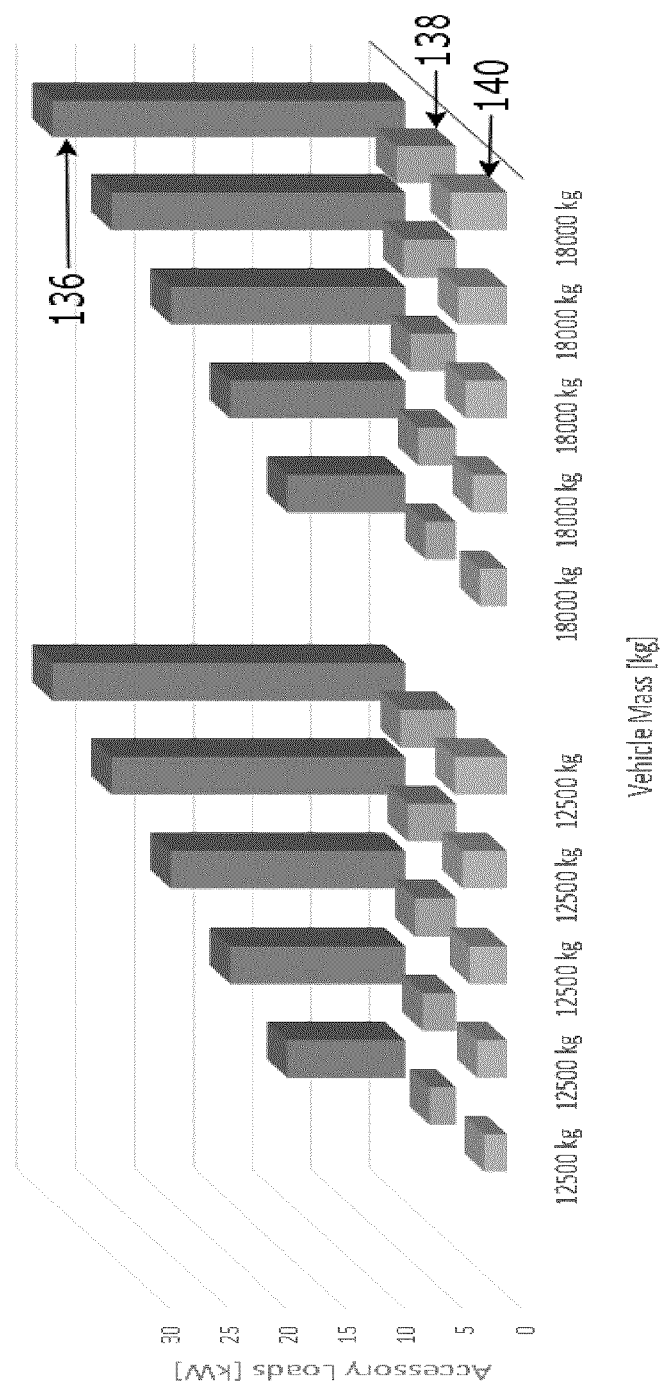

ELECTRIC VEHICLE POWER STEERING PUMP CONTROL SYSTEM

FIELD OF INVENTION

The present invention relates to vehicle power management to reduce power consumption of vehicles, particularly electric vehicles, including range-extended electric vehicles such as buses, cargo trucks and equivalent platforms when they are intermittently stationary.

BACKGROUND OF THE INVENTION

Electric Vehicles (EV's), also referred to as an electric drive vehicle, uses one or more electric motors or traction motors for propulsion. Three main types of electric vehicles exist, those that are directly powered from an external power station, those that are powered by stored electricity originally from an external power source and range extended electric vehicles (serial hybrid) are propelled by an electric drivetrain powered by an electrochemical battery which is recharged by a small internal combustion engine (ICE) such as a generator or a hydrogen fuel cell to extend vehicle range when the energy in the storage device becomes sufficiently depleted. Parallel hybrid electric vehicles incorporate an ICE to assist the drivetrain.

All of the traditional engine driven accessory components, such as the power steering pump, air compressor and even the HVAC system, are now electrically powered, reducing energy consumption and further reducing greenhouse emissions. However, the combined electrical load required to operate these more efficient accessories still use more power than the drive system on a commercial vehicle and therefore have a dramatic limiting effect on electric vehicle range.

An Electric Vehicle Power Steering Pump Control System is needed to be able to efficiently manage accessory use and optimize charging opportunities, thereby maximizing vehicle driving range across a broad spectrum of vehicle speeds and driving conditions typically found in transit bus and freight delivery operations. The proposed Power Steering Pump Control System should also be capable of being integrated with a comprehensive adaptive power management and charging control system for optimal efficiency for electric vehicles.

BRIEF SUMMARY OF THE INVENTION

The power steering pump control system reduces power consumption of a vehicle, by having a controller that sends a deactivation signal to a power steering pump motor when the vehicle becomes stationary. The resulting energy savings can be crucial to maximizing range when the vehicle is an electric vehicle, that is, a vehicle having a drivetrain powered by an electric motor. The module comprises an electrical system controller that sends an electrical current disable signal to an electrical switch for power steering pump motor when the electric vehicle becomes stationary. A vehicle speed sensor provides input to the controller when the electric vehicle becomes stationary. A vehicle door position sensor provides a door-open input signal to the controller when the door of the electric vehicle is open. The vehicle door position sensor senses when a door of the electric vehicle changes from open to closed and provides a door-open-to-closed input signal to the controller. The controller sends a signal to the electrical switch to reactivate a supply of electrical current supply to the power steering pump motor when the vehicle door position sensor senses that a door of the electric vehicle has changed from open to closed.

The power steering pump motor can be driven by an AC Induction Motor, which gets its power from the DC/AC inverter and can be switched on/off by a relay. The door position sensor can be a mechanical switch or proximity sensor. A proximity sensor is a sensor that detects the presence of nearby objects without any physical contact, typically by emitting an electromagnetic field or a beam of electromagnetic radiation (infrared, for instance), and looking for changes in the field or return signal. The object being sensed thereby is often referred to as the proximity sensor's target. Different kinds of proximity sensor targets may enable or require different kinds of proximity sensors. For example, a capacitive photoelectric sensor might be suitable for a door made of plastic material, while a metal door might require an inductive proximity sensor.

The power steering pump would typically be powered by direct current (DC), getting its electrical power from a DC/DC converter. For example, a 28V DC power steering pump motor drives a hydraulic pump used in commercial vehicles. The motor may be a brushless three-phase asynchronous motor with cage rotor and integrated power and control electronics. The motor and it power and control electronics are cooled by an integrated fan. The current operating condition is displayed by a status signal at any one time.

A hydraulic steering pump, connected to a combustion engine or gearbox is no longer needed. The electrical motor-pump system may provide a constant or selected hydraulic pressure and flow rate as needed to maintain the steering pump hydraulic pressure independent of the speed of a combustion engine and independent of speed of the drivetrain of the vehicle. The motor may have an integrated controller that provides variable speed and thus variable pumping effect for high energy efficiency.

A brake sensor provides an input signal to the controller when a brake for the electric vehicle is on, enabling the controller to send a signal to shut off the steering pump when the brake for the electric vehicle is on, the door is open and the electric vehicle is stationary.

Optionally, traffic light detection sensor in the system would sense a change of a traffic light in front of the vehicle from a stop-signal to a go-signal and provide data input accordingly to the controller. Such a change in an traffic light signal in front of the vehicle when stationary would be taken by the system's algorithm strategy as a predictor that the vehicle was about to change from a stationary state to a non-zero speed to progress past the traffic light, and the controller would send a signal to the electrical switch to reactivate a supply of electrical current supply to the power steering pump.

Conversely the traffic light detection sensor for sensing a change of traffic light from a go-signal to a stop-signal also provides such data input to the controller, and the controller could send a signal to the electrical switch to deactivate a supply of electrical current supply to the power steering pump upon a change of traffic light from a go-signal to a stop-signal, delayed however such that the vehicle becoming stationary is also a necessary condition for the deactivation signal.

The pump control system is capable of being integrated with a comprehensive an adaptive power management and opportunity charging control system for optimal efficiency of an electrically powered vehicle.

The comprehensive adaptive power management and opportunity charging control system for an electrically powered vehicle disclosed herein adapts to various loads on the vehicle as it travels its route, and automatically selects the most efficient times to turn on the charger, hence the term "opportunity" charging. The charging control system is configured to select the most productive opportunities to recharge the vehicle batteries, meaning during the times when the generator can be used to maximum efficiency as well as with the complimentary aim to reduce GHG emissions.

The power steering pump control system automatically selects optimal times to disable the power steering pump in order to allow charging system to produce maximum output during those periods when a vehicle is stationary such as when a bus is loading/unloading passengers, or at a traffic stop, or when the driver is on a break or layover stop.

When a typical passenger bus operates along a known route at a specific time of day, the following representative values can be used to estimate dwell time at the critical (busiest) stop: 60 seconds at a downtown stop, transit center, major on-line transfer point, or major park-and-ride stop; 30 seconds at a major outlying stop; and 15 seconds at a typical outlying stop. The average Dwell Time is approximately 35 Seconds and adds up to a significant series of time intervals during which power steering is not needed for the vehicle, and the energy used by the power steering system could be saved.

The controller includes a digital controller that implements a control strategy by running algorithms and sending power steering pump motor signals based on ongoing input in real time from vehicle condition sensors sensing conditions such as vehicle speed, vehicle door position, and external traffic conditions such as traffic signals.

The digital controller is preferably based on a distributed network with multiplexing capabilities, and can be integrated with a larger, comprehensive adaptive power management and charging control system for optimal efficiency for electric vehicles

BRIEF DESCRIPTION OF THE DRAWINGS

FIG. 3 is a graphical plot showing how much time a transit bus is stationary during its route.

FIG. 4 is a comparative chart showing a range of accessory loads for two representative vehicle masses, and also shows the power consumption rates without and with load shedding control.

DETAILED DESCRIPTION

All elements of the Electric Vehicle Power Steering Pump Control System & Method will now be introduced by reference to drawings & figures below, and then how each element functions and interacts with each other element will be described where necessary. Since the presently disclosed pump control system and method implements the resources of the Electric Vehicle Power Management & Driver Control System 10, the latter will first be outlined in FIG. 1. The present disclosure pertains to a novel Power Steering Pump Control System & Method which manages the operation of the Steering Pump 90 by means of ACC control signals 100 from the system controller 12.

Figure 1:
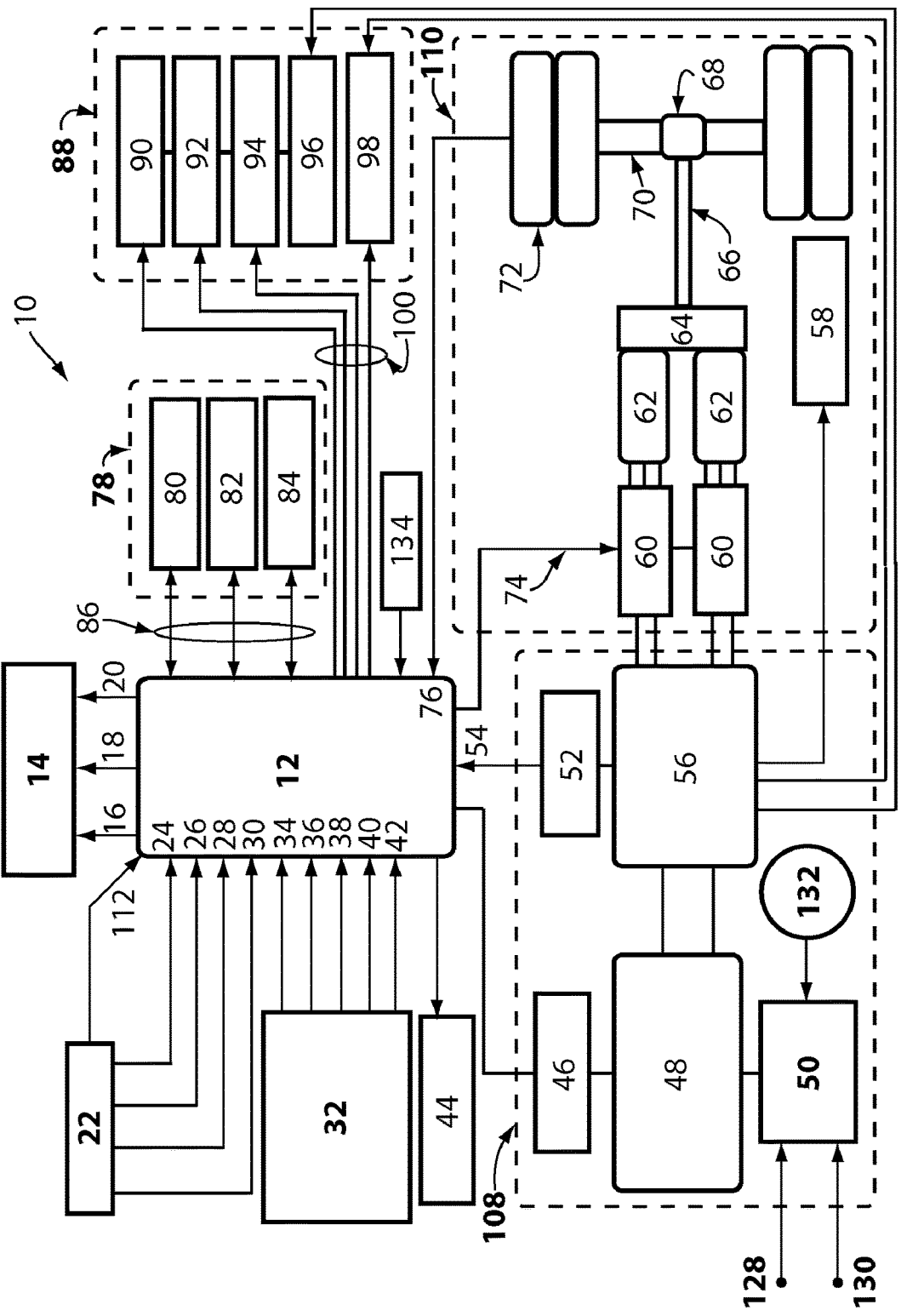
FIG. 1 diagrams the connections & interactions of the electric vehicle power management & driver control system which includes its related internal subsystem, the Power Steering Pump Control System & Method.

FIG. 1 shows the key elements of an innovative comprehensive adaptive power management and charging control system for electric vehicles, in which an Electric Vehicle Power Management & Driver Control System 10 optimizes how an electric power system 108 energizes and governs an electric drivetrain 110 depending on external sensor parameters sent to a system controller 12. The system controller 12 receives data from various driver inputs 22, chassis/body sensors 32, and a vehicle speed sensor 76; and also exchanges data with a chassis electronic control module (ECM) 78; sends telemetry output 44; sends realtime operational data to a driver system interface 14; and sends control signals to the drivetrain 110 and vehicle accessories 88. Elements of each of these subsystems will now be identified below.

The Driver System Interface 14 provides the vehicle operator with realtime information on vehicle speed 16, system faults 18, and battery state of charge (SOC) 20. The Driver (generated) Inputs 22 include data from a PRND (gearshift position) Switch 24, Accelerator position sensor 26, Brake Sensor 28, Parking Brake Sensor 112, and Route Selector 30. Chassis/Body Sensors 32 include Cabin/External Temperature Sensor(s) 34, Vehicle Mass Sensor(s) 36, Inclinometer(s) 38, Door Sensor(s) 40, Global Positioning Sensor(s) (GPS) 42 and an optional Traffic Light Detector 134. In addition the system controller 12 provides direct telemetry output 44 to external networks.

The Power System 108 is comprised of a Battery Management System (BMS) 46, a scaleable traction Battery Pack 48, a Power Distribution Box 56, and an External Charging Control System 50 that manages power input from an electric generator 132, an induction source 130, or a plugin source 128. A DC/DC Converter 52 supplies Low Voltage Power 54 to the System Controller 12 as well as key elements of the drivetrain 110.

The Drivetrain 110 includes a Brake Resistor(s) 58, Inverter(s) 60, AC Motor(s) 62, a Summation Gearbox 64, a Driveshaft 66, a Differential 68 gear hub, Driven Axle(s) 70, and Wheels 72. The System Controller 12 sends Motor Control Signals 74 to the inverters 60 to control motor 62 speeds. Vehicle speed data is digitized by a Vehicle Speed Sensor (VSS) 76 and sent back to the controller 12.

A Chassis Electronic Control Module (ECM) 78 includes control modules for an Antilock Braking System/Anti-Slip Regulation (ABS/ASR) 80, an Electronic Brake System/Electronic Stability Control (EBS/ESC) 82, and a Generator (ICE) 84, all of which exchange data with the system controller 12 by means of a J1939 Controller Area Network (CAN) 86 bus.

Vehicle Accessories (ACC) 88 include a Steering Pump 90, an Air Compressor 92, Heating 94, DC/AC Inverters 96, and HVAC-DC 98, all of which receive ACC Control Signals 100 from the System Controller 12. In addition, the DC/AC Inverters 96 and HVAC-DC 98 receive direct power from the Power Distribution Box 56.

Figure 2:
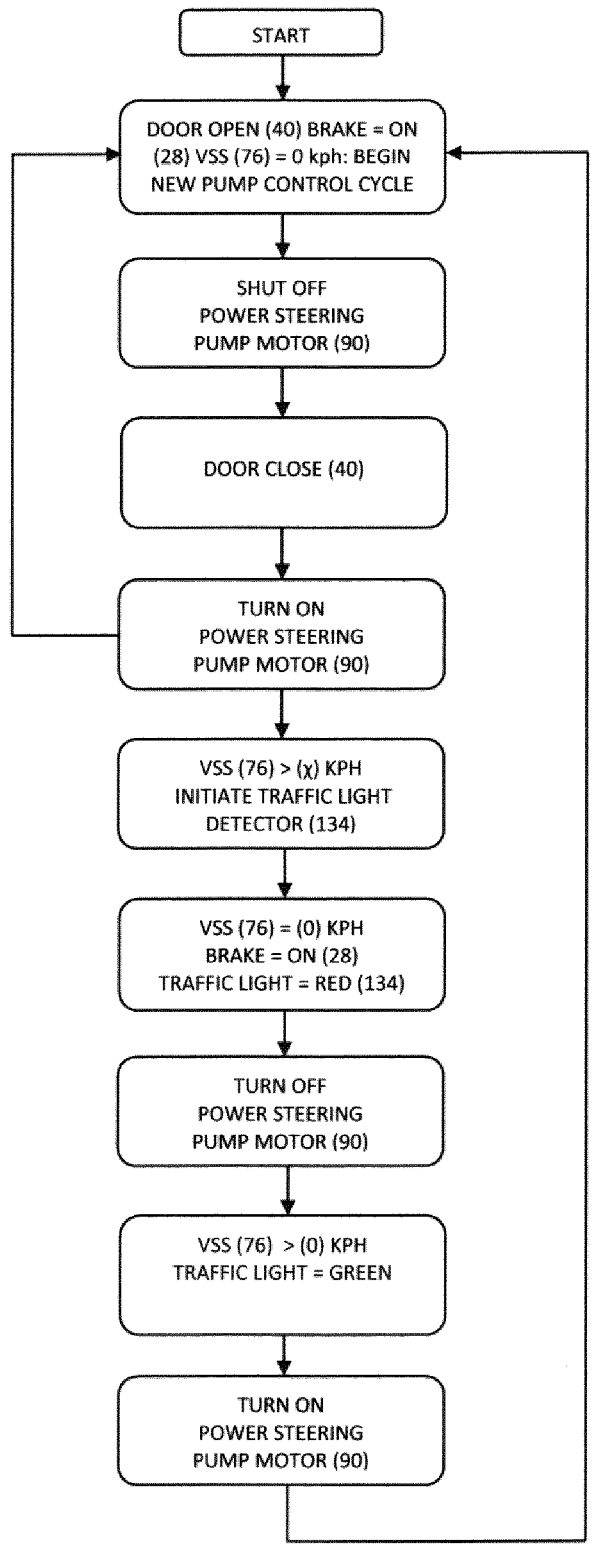
FIG. 2 diagrams how the Power Steering Pump Control System & Method operates.

FIG. 2 diagrams how the Power Steering Pump Control System & Method operates the pump 90 motor by detecting conditions necessary to begin a new pump control cycle, namely Door Sensor 40 showing an open door, Brake Sensor 28 showing that the brakes are ON, and VSS 76 at 0 kph. If these conditions are met, the pump motor 90 is shut off until the door sensor 40 shows that the door is closed. While the vehicle is underway, a traffic light detector 134 may be used in conjunction with brake 28 & speed 76 sensors to detect that the vehicle is stopped for a light, during which time the pump motor 90 is turned off. Once the traffic light turns green, as signaled to the system controller 12 by the traffic light detector 134, the pump motor 90 is turned back on.

FIG. 3 is a graphical plot showing how much time a transit bus is stationary during its route by plotting speed (mph) against time (mins). FIG. 4 is a comparative chart showing a range of accessory loads 136 in kilowatts (kW) for two representative vehicle masses, and also shows the power consumption rates in kilowatt-hours (kW/h) without load shedding control 138 and with load shedding control 140. The preferred embodiment of the Electric Vehicle Power Steering Pump Control System & Method will now be described in detail.

The disclosed power & charging control system needs to shed the pump motor 90 load at the appropriate times and durations for efficient vehicle opportunity charging, and so needs specific triggers to start and end the pump motor control cycle. (see FIG. 2) Two methods include, but are not limited to, door control method and traffic light detection.

Table 1 below lists characteristic parameters of the Passport Transit Bus Duty Cycle Data. FIG. 3 shows the frequency & duration of dwell time by showing speed vs. time for the same bus company.

TABLE 1

| | |
|---|---|
| Maximum Speed | 40 MPH |
| Maximum Grade | 9% |
| Route Distance | 8 miles |
| Route Duration | 3601 Seconds |
| Zero mph At Bus Stops | 1268 Seconds |
| Zero mph In Traffic | 321 Seconds |

The data above in Table:1 and in FIG. 3 demonstrates that there is significant amount of time when a transit vehicle is stationary and when the power steering pump motor 90 should be disabled to permit more efficient opportunity charging of the vehicle battery pack 48.

Door Control Method:

The preferred method to actuate the pump motor 90 control cycle is when the door sensor 40 detects an open door. As outlined in FIG. 2 above, the system controller 12 then sends an ACC control signal 100 to deactivate the pump motor 90. The control cycle is only permitted when the vehicle is stationary and the brakes are on. When the door sensor 40 shows that the door is closed, the pump 90 is reactivated.

Traffic Light Detection:

An additional method to actuate the pump motor 90 control cycle is by the use of a traffic light detector 134 sending signals to the system controller 12 which maximizes the efficiencies of the door control method.

FIG. 4 is a comparative chart highlighting the excessive power used by a range of accessory loads (136) in kW for two representative vehicle masses of 12500 Kg and 18000 Kg. FIG. 4 also shows the power consumption rates in kW/h with the load shedding control (140) herein disclosed and without such load shedding control 138.

The chart data shows how vehicle energy consumption is reduced by controlling the power steering pump 90 duty cycle with the system controller 12 to shed a significant power load when it is opportune to do so. The pump is turned off/on by the door position signal at bus stops and layover. The power steering AC inverter and pump motor 90 controller energy consumption used for the chart was 7 kW. The chart does not take into account time the bus is stopped at traffic lights. The power steering pump duty cycle control can be optimized by incorporating a "Traffic Light Detection" system.

The system provides significant advantage in electrically powered vehicles such as buses, cargo trucks and equivalent platforms, but could also provide some energy savings if implemented in other vehicles such as gasoline, diesel or other fuel combustion motor powered vehicles, where the power steering system is driven directly or indirectly from the fuel combustion motor. Deactivating the power steering during periods when the vehicle is stationary although in use will result in reduced heat and energy during such periods.

The foregoing description of the preferred apparatus and method of operation should be considered as illustrative only, and not limiting. Other techniques and other materials may be employed towards similar ends. Various changes and modifications will occur to those skilled in the art, without departing from the true scope of the invention as defined in the above disclosure, and the following general claims.

The invention claimed is:

1. A vehicle comprising:
 a power steering pump;
 a controller configured to control the power steering pump;
 a traffic light detection sensor configured to sense a change of a traffic light from a go-signal to a stop-signal and to transmit an indication of the sensed traffic light change to the controller; and
 a speed sensor configured to detect a traveling speed of the vehicle and to transmit vehicle speed information to the controller, the controller being configured to determine that the vehicle is stationary based on received vehicle speed information;
 wherein the controller is configured to deactivate the power steering pump to reduce power consumption of the vehicle responsive to both determining that the vehicle is stationary and receiving the transmitted indication of the traffic light change from the traffic light detection sensor.

2. The vehicle of claim 1, wherein the traffic light detection sensor is further configured to sense a second change of the traffic light from the stop-signal to a go-signal and to transmit a second indication of the traffic light change to the controller; and wherein the controller is further configured to reactivate the power steering pump upon receiving the second indication from the traffic light detection sensor.

3. The vehicle of claim 1, in which:
 a) an electrical current disable signal is sent by a controller to an electrical switch for a power steering pump motor when the vehicle becomes stationary;
 b) a brake sensor provides an input signal to the controller when a brake for the vehicle is on;
 c) the controller sends a signal to shut off the steering pump when the brake for the vehicle is on and the vehicle is stationary;
 d) a traffic light detection sensor for sensing a change of traffic light from a go-signal to a stop-signal provides data input to the controller, and the controller sends a signal to the electrical switch to deactivate a supply of electrical current supply to the power steering pump upon a change of traffic light from a go-signal to a stop-signal.

4. The vehicle of claim 1, in which:
 a) an electrical current activation signal is sent by a controller to an electrical switch for a power steering pump motor when the vehicle is greater than zero kph;

b) a brake sensor provides an input signal to the controller when a brake for the vehicle is released;
c) the controller sends a signal to turn on the steering pump when the brake for the vehicle is released;
d) a traffic light detection sensor for sensing a change of traffic light from a stop-signal to a go-signal provides data input to the controller, and the controller sends a signal to the electrical switch to reactivate a supply of electrical current supply to the power steering pump upon a change of traffic light from a stop-signal to a go-signal.

5. The vehicle of claim 3 or 4, in which:
a) the controller includes algorithm-based control strategy that is modified in real time depending on input from vehicle condition sensors;
b) the controller is a digital controller that is based on a distributed network with multiplexing capabilities.

6. The vehicle of claim 1, in which sensors measure at least vehicle mass and road grade, and vehicle mass and road grade are measured as a door of the vehicle closes and the algorithm calculates a new power output for an electric vehicle motor based on the vehicle mass and road grade.

7. The vehicle of claim 3 or 4, in which sensors measure at least vehicle mass and road grade, and vehicle mass and road grade are measured as a door of the vehicle closes and the algorithm calculates a new power output for an electric vehicle motor based on the vehicle mass and road grade.

* * * * *